Dec. 10, 1929.  G. A. GILLEN  1,738,699
AUTOMOBILE WHEEL LOCK
Filed April 21, 1923
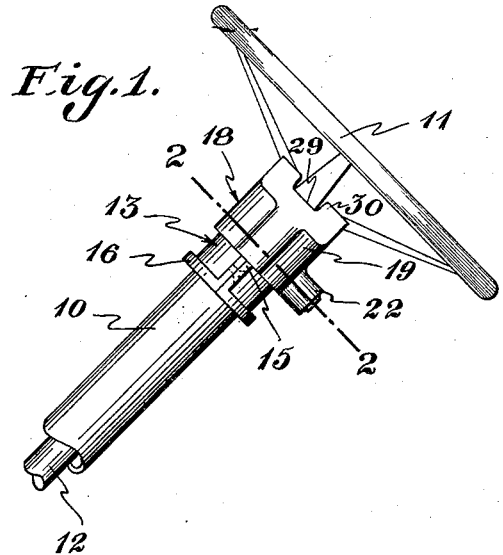
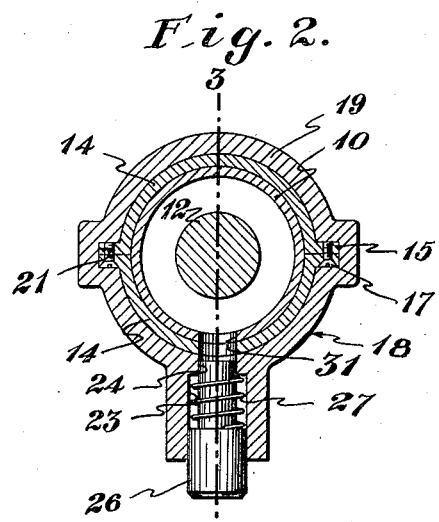
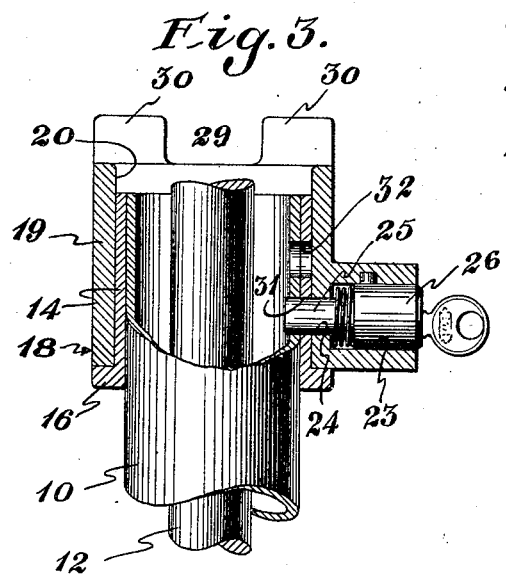
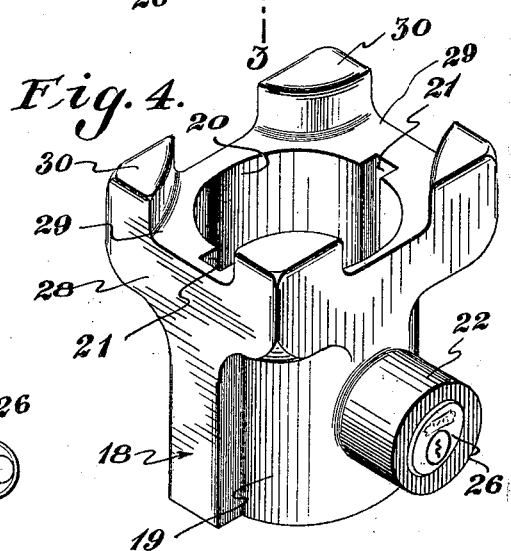
INVENTOR
George A. Gillen.
BY
ATTORNEY Patented Dec. 10, 1929

1,738,699

UNITED STATES PATENT OFFICE

GEORGE A. GILLEN, OF JERSEY CITY, NEW JERSEY, ASSIGNOR TO GILLEN, KIMMEY, BAKER SYNDICATE INC., OF NEW YORK, N. Y., A CORPORATION OF NEW YORK

AUTOMOBILE WHEEL LOCK

Application filed April 21, 1923. Serial No. 633,604.

This invention relates to improvements in steering wheel locks for motor vehicles and its primary object is to provide a device which is adapted to engage the steering wheel spider in such manner as to prevent said wheel from turning, and thereby frustrate any attempt of an unauthorized person to drive the vehicle.

Another object of the invention resides in the provision of a locking bolt so designed that when projected it enters the steering column and effectively ties the locking mechanism and associated parts thereto.

A further object of the invention is to provide a device which may be readily applied to the ordinary steering mechanism of a vehicle without in any way altering or weakening its structure.

With the above and other objects in view which will become more apparent as the description proceeds, the invention consists in the novel construction, combination and arrangement of parts which will be fully set forth in the following specification, claimed and illustrated in the accompanying drawing, in which:—

Figure 1 is a side view of a steering wheel and column showing my invention applied thereto, Figure 2 is an enlarged sectional view taken on line 2—2 of Fig. 1 and showing the locking bolt withdrawn, Figure 3 is a sectional view taken on line 3—3 of Fig. 2 showing the locking bolt projected, and Figure 4 is a perspective view of the wheel spider engaging member.

Referring to the drawings in detail, the numeral 10 designates the steering column of a vehicle provided at its upper end with the customary steering wheel 11 which is keyed or otherwise secured to the steering shaft 12 which is usually housed within the column.

Embracing the column directly beneath the steering wheel 11 is a guide designated generally by the numeral 13 which comprises a pair of arcuate members 14 provided along their side edges with outwardly extending guide flanges 15. These flanges in addition to forming guides upon which the wheel locking element slides also are pierced to receive attaching screws 17 by means of which the parts of the guide are clamped in place on the column. Stop flanges 16 are formed at the lower ends of the arcuate members 14 to limit the downward movement of the wheel engaging element previously mentioned.

The wheel engaging and locking element is designated generally by the numeral 18 and comprises a body 19 provided with a longitudinal opening 20 of a diameter to readily receive the guide 13. Formed in the body 19 at diametrically opposite points are guide channels 21 for the reception of the flanges 15 and extending radially from said body intermediate the channels 21 is a boss 22 provided with a relatively large bore 23 which communicates at its inner end with a reduced opening 24 through which the locking bolt 25 operates. This locking bolt 25 is provided at its outer end with the customary cylinder 26 housing the tumbler pins and locking mechanism usually forming a part of the ordinary type of pin tumbler lock.

In order to assist in the operation of the bolt, a compression coil spring 27 is disposed around said bolt between the cylinder 26 and the inner end of the bore 23 in such a manner as to normally urge said bolt outwardly.

Formed at the upper end of the body 19 is a head 28 which is notched or recessed as at 29 to provide a plurality of upwardly extending lugs or fingers 30 which are adapted to be received between the spokes of the steering wheel spider as illustrated in Figure 1.

In order that the wheel locking element 18 may be locked in open and closed positions, and the parts bound together by the locking bolt, the guide 13 and steering column 10 are each pierced as at 31 and 32 and it will be seen that when the bolt 25 is withdrawn, the wheel locking element will be free to slide longitudinally on the guide 13, but when the bolt is projected, it enters one or the other openings 31 or 32 and effectively locks the elements together in either locked or unlocked position.

While in the foregoing there has been shown and described the preferred embodiment of this invention, it is to be understood that minor changes in the details of construction, combination of parts may be resorted to without departing from the spirit and scope of the invention as claimed.

Having thus described my invention, what I claim as new and desire to secure by Letters Patent, is:—

1. The combination with the steering column and steering wheel of a vehicle, of a guide embracing the column, means slidable on the guide for engaging the spokes of the wheel and preventing its rotation relative to the column, the guide and column being pierced, and a bolt carried by the wheel locking means for entering the guide and column to lock the parts to the column and the wheel against turning.

2. The combination with the steering wheel and steering column of a vehicle, of a guide comprising a pair of semicircular members embracing the steering column, guide flanges on said semicircular members, means extending through the guide flanges to hold the members in such embracing position, a sleeve slidable on the guide and held against turning movement thereon by said flanges, lugs on the sleeve for engaging the spokes of the steering wheel, the steering column and one of the semicircular members being provided with aligning openings, and a bolt carried by the sleeve and adapted to be projected through the openings to lock the sleeve, and the guide to the steering column and against rotation relative thereto.

3. The combination with a steering column and steering wheel of a vehicle, of a guide sleeve embracing the column, a locking sleeve slidable on the guide sleeve into and out of engagement with the steering wheel for securing or releasing said steering wheel and a locking bolt extending from the locking sleeve through the guide sleeve and into the column to secure the locking sleeve in the position of locking engagement with the wheel and to further secure said locking sleeve in locked position upon the guide and the guide in locked position upon the column.

In witness whereof I have affixed my name.

GEORGE A. GILLEN.